May 25, 1965   R. C. KIRK ETAL   3,185,592
HIGH POWER OUTPUT MAGNESIUM PRIMARY BATTERY
Filed Aug. 18, 1961

INVENTORS.
Roy C. Kirk
Richard E. Carr

BY C. Kenneth Bjork
AGENT

United States Patent Office 3,185,592
Patented May 25, 1965

3,185,592
HIGH POWER OUTPUT MAGNESIUM
PRIMARY BATTERY
Roy C. Kirk and Richard E. Carr, Midland, Mich., assignors to The Dow Chemical Company, Midland, Mich., a corporation of Delaware
Filed Aug. 18, 1961, Ser. No. 132,463
3 Claims. (Cl. 136—100)

This invention relates to a high drain primary cell system and more particularly is concerned with a multi-cell, short-life, high drain primary battery utilizing magnesium or magnesium-base alloy anodes.

It is a principal object of the present invention to provide a multi-cell, primary battery capable of operating at high power outputs for as long as 12 hours or more.

It is an additional object of the present invention to provide a primary battery composed of a multiplicity of cells utilizing a common electrolyte wherein inter-cell shorting through the electrolyte is held to an acceptable low level during operation.

It is a further object of the present invention to provide a multi-cell high power output primary battery activated by immersion in sea water which battery can be used to power torpedoes and other underwater driven devices.

It is another object of the present invention to provide a primary battery that is relatively inexpensive to fabricate and has a high energy output per unit of weight.

These and other objects and advantages will become apparent from the detailed description presented hereinafter when read in conjunction with the accompanying drawing.

Figure 1:
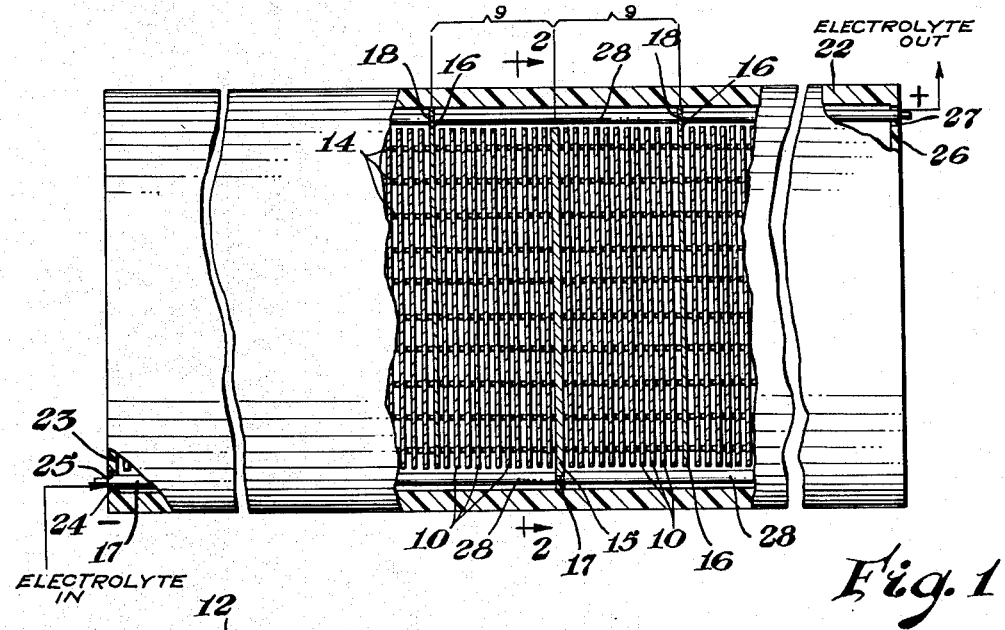
FIGURE 1 is a cross-sectional view of one embodiment of a battery of the present invention.
Figure 3:
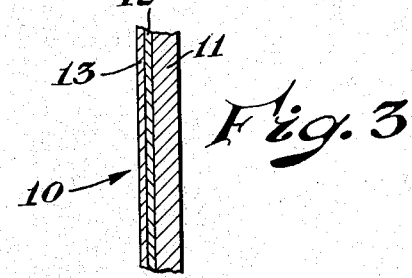
FIGURE 3 is a fragmentary, enlarged view showing one duplex electrode assembly of the battery embodiment of FIGURE 1.
Figure 2:
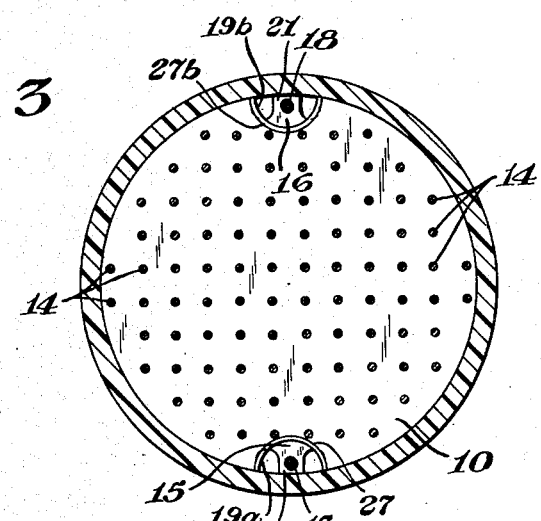
FIGURE 2 is a cross-sectional view of the battery of FIGURE 1 taken along line 2—2 of FIGURE 1.
Figure 4:
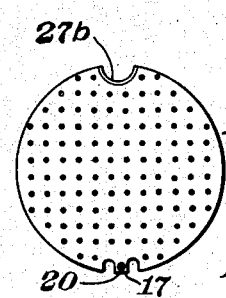
FIGURE 4 is a view of one of the end plates for a cell of the battery shown in FIGURE 1.
Figure 5:
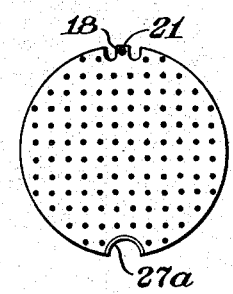
FIGURE 5 is a view of the opposite end plate for one of the cells of the battery shown in FIGURE 1.

In general, the battery of the present invention comprises a plurality of modules or cells joined together in an electrical parallel arrangement. Each of the modules consists of a plurality of flat, plate-like duplex electrodes, the number of electrodes being determined by the voltage desired in the module. Each electrode comprises a magnesium based metal anode having an electron conductive coating deposited on one surface. An electron conducting cathode material having a low hydrogen overvoltage is deposited onto the electron conductive coating. A bare magnesium based metal plate anode forms one end plate of each module and a low hydrogen overvoltage cathode plate forms the opposite end plate of this module. The anode end plates are connected to a common connector and the cathode end plates to a separate common connector thereby giving a battery of cells connected in electrical parallel arrangement. The duplex electrodes and end plates are positioned in the cell so as to have each cathode surface facing an anode surface and vice versa and have a passage for electrolyte between the plates. The so-connected modules are encased in an electrically insulating jacket or cover having an entry port and exit outlet which during operation of the battery provides for a continuous flow of electrolyte through the battery.

One embodiment of the new and novel battery shown in the figures consists of a plurality of modules 9 each containing a predetermined number of duplex electrodes 10. Each electrode 10 comprises a circular, flat magnesium or magnesium based alloy anode 11 to one side of which has been applied a liquid impervious, electron conducting material 12. A low hydrogen overvoltage, electron conducting cathodic material 13 is deposited onto the surface of the conducting material 12. The duplex electrodes are positioned in the module 9 so that the flat faces all are parallel one to another and the anode surface of a given electrode faces the cathode surface of an adjacent electrode and vice versa. The so-positioned duplex electrodes 10 within a given module 9 are separated by electrically insulating spacers 14. For ease in preparing the modules 9, the spacers 14 can be fastened to facing sides of adjacent plates by an adhesive. One circular end plate 15 of each module 9 is of non-coated magnesium based metal and is positioned to face cathode surfaces from the end electrodes in two adjacent modules 9. The other circular end plate 16 of a module 9 is of a low hydrogen overvoltage cathode material and positioned to face the anode surfaces of the end electrodes in two adjacent modules 9. The end plates are spaced apart from the electrodes by spacers 14. The anode end plates 15 of all modules 9 are connected to a common connector 17 extending through the length of the assembled battery and the cathode end plates 16 are connected to a similar connector 18, these connectors in the assembled battery being diametrically opposite.

The duplex electrodes 10 all have semicircular openings 19a–19b in opposite edges through which the connectors 17 and 18 can pass without touching the electrodes and which also provide a means for electrolyte flow from cell to cell. The module end plates 15 are connected to the conductor 17 by means of a projection 20, on the one edge of the plate the conductor passing through the plate and making a snug fit therewith. The opposite side of the plate 15 has an indentation similar to that of the duplex electrodes. The end plates 16 are connected to conductor 18 by passing through similar projections 21 on one edge of each plate and these plates 16 also have the shaped indentation in the side opposite the projection 21.

The so-connected modules 9 are encased in an electrically insulating, liquid impervious protective coating or jacket 22. One end wall 23 of the jacket 22 is fitted with an inlet port 24 aligned to mate with the aligned indentation 19a of each of the duplex electrodes 10 and those of the cathode end plates 16. This port 24 is of such a diameter that there is an annulus between the port wall 25 and connector 17 through which a ready flow of electrolyte can be introduced into the battery. The other end wall 26 of the jacket 22 is fitted with an exit port 27, this being positioned to mate with the aligned indentations 19b of the duplex electrodes 10 and those of the anode end plates 15. This port 27 accommodates the connector 18 in the same manner as inlet port 24 accommodates connector 17.

Preferably, the edge of the indentations 19a and 19b in the electrodes will be fitted with electrically insulating members 27a–27b respectively which just cover this edge. Also, the connectors 17 and 18, where these do not contact the anode and the cathode module end plates 15 and 16 respectively will be covered with an insulating protective coating 28. These members 27a–27b or coatings 28 can be firmly attached to the corresponding plates by an adhesive bond or other means known to one skilled in the art.

Alternatively, if desired the semicircular openings 19a–19b in electrodes 10 can be replaced by two diametrically opposed circular openings near the edges of the electrodes 10. An electrically insulating manifold tube, having a narrow slot over its entire length then can be passed through inlet port 24 and through the circular opening, fitting snugly therein or adhesively bonded thereto, on one edge, of the aligned plates and a second manifold similarly be passed through the exit port 26 and the second set of aligned circular openings. These tubes thereby loosely surround the connectors 17 and 18 leaving an annular space between the connector and the manifold tube.

The assembly battery is joined by conventional leads or contacts (not shown) through the connectors 17 and 18 to the device being operated or driven.

The anode material used in the cells can be magnesium or a magnesium based alloy having a magnesium content of at least 80 weight percent which can be fabricated into the desired shape. Desirably the selection of the anode material will be made from those alloys wherein optimum cell voltages and high anode efficiencies can be realized. Especially useful anode materials are those alloys which contain from about 1 to about 6 weight percent or more of aluminum. Preferably alloys containing the higher amounts of aluminum will be employed as these, during battery operation, yield a flocculent corrosion product that is loosely held to the anode and is readily washed away from the anode surface.

Examples of a number of alloys suitable for use as anode materials are the ASTM designated AZ31, AZ10, AZ63, AZ61A, A3A, AZ21 and the like magnesium based alloys.

The size of the anode is dictated by the size limitations of the cell. The thickness of the anode will be determined by the length of operating life desired in the cell. Normally, for most operations the anode thickness will range from about 0.010 up to about 0.50 inch or more.

The duplex electrodes are fabricated by applying a liquid impervious, electrically conductive layer to one face of the magnesium metal anode and in turn covering the exposed surface of this layer with a thin layer or coating of an electron conducting cathode material having a low hydrogen overvoltage.

The conductive coating or layer applied directly to the magnesium can be any of a variety of materials which are liquid impervious and electron conducting. Suitable coatings include, for example, bake-type or amine cured epoxy resins or irradiated polyethylene films having finely divided particulate carbon or metal powders incorporated therein; pore-free metal foils, e.g., copper, nickel or silver, can be cemented to the magnesium surface by conductive plastic; a deposited metal, e.g., nickel applied by electro- or electroless plating, by gas plating or by vapor condensation can be used. Highly satisfactory results are obtained by using a bake-type or amine cured epoxy resin containing particulate carbon.

The material used for the cathode layer itself is an electron-conductive member the surface of which has a low hydrogen overvoltage. Materials which are suitable for use as cathodes in the present invention are those exhibiting a maximum hydrogen overvoltage of about 0.50 volt as measured in a 0.1 molar aqueous sulfuric acid solution at a current density of about 0.01 ampere per square inch including for example platinum, gold, iridium nickel, osmium, platinized conductive metals, platinum plated carbon and the like.

The cathode material, for example, platinum can be directly applied to the conductive layer on the magnesium or to an electrodeposit of nickel, for example, which had previously been applied to the conductive layer. The platinum can be applied by conventional techniques such as electrodeposition, immersion displacement, thermal decomposition of platinic chloride, or chemical reduction of a platinum containing component, e.g., reduction with formaldehyde of a platinum chloride solution which had been sprayed onto the coated magnesium surface.

The connectors for joining the end plate anodes of the module in electrical parallel arrangement can be of any electron conductive material used for electrical leads, junctions and the like connections. Ordinarily, copper, aluminum, silver or other metals will be used. These can be in the shape of a rod, bar, plate or other convenient and useful configuration. The electrodes can be connected to these connections by means known to one skilled in the art.

The outer case or jacket, insulating member fitted to the edges of the electrodes, connector covering, manifold tube (if used) and spacers used in the battery can be prepared from any of a wide variety of insulating, non-electron conducting materials possessing the requisite properties and characteristics to meet environmental and structural conditions and limitations to which the battery may be subjected. Natural and synthetic rubbers, silica glasses, ceramics, phenolformaldehyde resins, polystyrene resins, polyethylene, polypropylene, asphalt based materials, hydrophobic waxes, acrylic resins sold under the trade-mark Lucite, Saran and the like are illustrative of the insulators useful for this application.

These non-conductive elements can be fabricated by conventional forming techniques such as molding, extruding, drawing and the like.

The outer case can be prepared independently as a tubular member, for example, of such a size to snugly accommodate the electrically connected electrodes and end plates and the connected modules then be inserted therein so that the plates are perpendicular to the axis of the cylinder. The end walls of the jacket then can be attached by conventional means such as adhesive bonding, screw fasteners, clamps, etc., to give a liquid impervious seal. Alternatively the entire case can be molded or formed directly around the assembled modules.

The spacers should be of such size that they cover a minimum amount of the anode surface. Preferably, these will be in the shape of rods, spherical beads, small right cylinders, regular prisms, strips, and the like.

Preferably the inlet port in the outer jacket for electrolyte will be at the bottom of one end of the battery and the exit port will be at the top of the opposie end. For those devices which are propelled and move through the electrolyte, e.g., torpedoes, it is desirable that the inlet port be at the front of the battery, i.e., facing the direction of movement of the device. However, this is not a limiting factor as the light weight gases liberated during the reaction in the cell will rise up through the cells, thereby establishing a natural flow pattern of electrolyte from bottom to top.

If desired, an impressed flow, e.g., electrolyte pumped from an external reservoir, can be used to introduce electrolyte into the battery.

Alternatively, if desired, the inlet and the outlet ports for electrolyte can be holes of controlled size and spacing extending through the outer casing. With this arrangement intercell shorting can be minimized by placing the holes at 90° angles in adjacent modules and by varying the angle at which these holes penetrate the casing.

Although any of a wide variety of aqueous electrolyte solutions are useful to activate the present cell, preferably the electrolyte for the cell will be selected from the group consisting of sea water, the alkali metal chlorides and bromides, ammonium chloride, ammonium bromide and the alkaline earth metal chlorides and bromides including magnesium chloride and magnesium bromide. These electrolytes can be used alone or as mixtures.

The concentration of the electrolyte to be used is not critical as satisfactory performance is obtained using sea water which contains as the prime solute about 3 percent by weight sodium chloride as well as even more dilute solutions, i.e., those containing about 1 percent or less by weight solute. Also more concentrated electrolytes including even those which are saturated with the solute member can be employed.

In any event, it is essential that the electrolyte move through the modules. This movement is needed in order to remove corrosion product from the close-spaced electrodes and to dissipate heat generated in the battery because of the relatively high rate of power output. Therefore, this battery finds particular effective utility in sea water operations where the entire unit is immersed in the electrolyte and is used to propel an underwater vehicle.

In fabricating the battery, it is desired that the distance between duplex electrodes and these electrodes and the module end plates be kept as small as possible in order to minimize internal cell resistance, which shows up as lost battery energy, since the ion path resistivity of the electrolyte increases markedly with increase in length of this path between plates.

The minimum distance between the plates is that distance which still permits electrolyte flow through the battery, and gives room for the anode corrosion product to slough off and be washed away. Ordinarily the spacing between the electrodes will be from about 0.01 to about 0.20 inch.

To further illustrate the present invention, a battery was prepared according to the embodiment shown in the figures. This battery was designed to specifications requiring that it be capable of delivering a power output of about 106 kilowatt hours at 200 volts over a 12 hour period in sea water and was to have a weight limitation of 1500 pounds (less electrolyte) and a volume limitation of 16 cubic feet.

Cell modules were prepared having 540 circular duplex plate-like electrodes. Each electrode was about 20 inches in diameter and was fabricated from .018 inch thick AZ61A alloy coated on one side with copper and having a thin layer of platinum thereon to give a total coating thickness of about 0.002 inch. The duplex electrodes were separated by cylindrically-shaped polystyrene resin spacers of size to give a distance of about 0.016 inch between electrodes. Each module had one end plate of non-coated AZ61A alloy and the other end plate of a thin conductor plated with platinum. All of the anode end plates were connected in parallel to a common copper bus bar and the cathodes were connected in a similar fashion to a second similar copper connector. Four modules were connected in parallel using copper connectors as shown in the figures, in such a manner that the openings in all of the plates were in direct alignment. The so-assembled modules then were covered with a tubular polystyrene jacket.

Polystyrene resin plates having a port therein to loosely accommodate the connectors were fastened to the ends of enveloping jacket to give a liquid impervious case through which liquid could pass only at the desired inlet and outlet ports.

The resulting battery weighed about 950 pounds (less electrolyte) and had a volume of about 14.1 cubic feet. With a sea water electrolyte, the battery voltage at a current density of about 9.4 amperes per square foot was about 200 volts and the battery had an average current output of about 44.2 amperes, which for a 12 hour operating period is equivalent to a power output of about 106 kilowatt hours.

A second battery of this same design was prepared utilizing AZ61A anodes having a thickness of about 0.035 inch and a spacing of about 0.03 inch between electrodes in a module. In each module, 620 duplex electrodes were connected in series. The anode end plates were connected to a common connector and a like number of platinum coated copper cathodes similarly connected to a second connector. Two modules were connected in parallel to give the core of the battery.

The final battery had a total weight of about 1007 pounds and a volume of about 15.1 cubic feet and gave a power output approximately the same as for the battery described hereinbefore.

The illustrative batteries described herein represent only one embodiment of the present invention as will be recognized by one skilled in the art and are not meant to be limiting.

In a manner similar to that shown hereinbefore a battery can be fabricated having a multiplicity of cells using rectangular AZ21 magnesium alloy anode-platinized nickel cathode for the duplex electrodes and natural rubber case, spacers, manifold tube and module end plates.

Additionally, a battery can be made containing AZ10 elliptically shaped anode-rhodium coated carbon cathode duplex electrodes and having its non-electrically conductive parts fabricated from silica glass.

Modules containing square AZ63 alloy anode-gold plated mild steel cathode duplex electrodes, ceramic end plates and polyethylene spacers and manifold tube, can be joined in series and place in a Lucite case.

Likewise a battery can be constructed using cell magnesium anode-platinum coated brass cathode duplex electrodes and synthetic rubber insulating members.

Any of the construction materials listed herein for fabricating a given member can be utilized in a battery with any of the other suggested construction materials. Likewise the batteries can be activated using any of the electrolytes presented hereinbefore.

Other modifications can be made in the present invention without departing from the spirit or scope thereof for it is understood that we limit ourselves only as defined in the appended claims.

We claim:

1. A high drain primary battery which comprises a plurality of individual modules, each of said modules containing a plurality of duplex electrodes, a magnesium base plate-like anode end member and a low hydrogen overvoltage plate-like cathode as the opposite end member, each of said duplex electrodes consisting of a plate-like magnesium based metal anode having an electron conducting coating on one side thereof and a layer of a low hydrogen overvoltage cathode material on said electron conducting coating, the cathode surfaces of the electrodes facing an anode surface of an adjacent electrode in said module said duplex electrodes defining openings in opposite edges, said module anode end members attached to a common electrical connector and said cathode module end members attached to a second common electrical connector, said electrical connectors passing through the openings defined in said duplex electrodes without touching said duplex electrodes, spaces between the plate-like electrodes providing a passage for electrolyte, the openings defined in said duplex electrodes providing a means for electrolyte flow from module to module, the entire assembly of parallel electrically connected modules being encased in an electrically insulating jacket, said jacket having an entry port for introducing an aqueous electrolyte into said battery and an exit port for removing the electrolyte from said battery, and an aqueous electrolyte, said electrolyte flowing through said battery during battery operation.

2. A high-drain primary battery which comprises; a plurality of individual modules, each of said modules containing a plurality of circular, flat duplex electrodes and a magnesium based metal anode end plate and a platinum coated electron conducting cathode end plate, each of said electrodes consisting of a magnesium based alloy anode having a liquid impervious, electron conducting layer on one side thereof and a thin platinized cathode layer on said electron conducting layer, said electrodes and end plates being positioned in said modules so that their flat faces are parallel and the cathode surface of a given electrode faces the anode surface of an adjacent electrode, electrically insulating spacers placed between said electrodes, all of said anode end plates of said modules connected to a common metal rod-like electrical connector and all of said cathode end plates of said modules connected to a second similar common metal rod-like electrical connector, the metal connectors for said anode end plates and cathode end plates being positioned in the module so that they are diametrically opposed, each of said duplex electrodes having openings in opposite edges through which pass the connector rod, said parallel electrically connected modules encased in an electrically insulating, liquid impervious, cylindrically shaped protective coating, said coating having one end wall fitted with an inlet port aligned to mate with one series of openings in the connected modules, the other end wall of said protective coating having an exit port positioned to mate with the second series of openings in the connected modules the first and second series of openings in opposite edges of said duplex electrodes providing a means for electrolyte flow from module to module from said inlet port to said exit port, and an aqueous electrolyte, said electrolyte flowing into said inlet port, between the plates of said modules and through said first and second series of openings in said duplex electrodes and exiting from the battery at said exit port.

3. A high-drain primary battery which comprises; a plurality of individual modules, each of said modules containing a plurality of duplex electrodes, a magnesium base metal anode end plate and a low hydrogen overvoltage electron conducting cathode as the other end plate, said low hydrogen overvoltage electron conducting cathode being characterized in that it exhibits a maximum hydrogen overvoltage of about 0.50 volt as measured in a 0.1 molar aqueous sulfuric acid solution at a current density of about 0.01 ampere per square inch, each of said duplex electrodes consisting of a magnesium based alloy anode having a liquid impervious, electron conducting layer on one side thereof and a thin layer of a low hydrogen overvoltage cathode material on said electron conducting layer, said low hydrogen overvoltage material being characterized in that it exhibits a maximum hydrogen overvoltage of about 0.50 volt as measured in a 0.1 molar aqueous sulfuric acid solution at a current density of about 0.01 ampere per square inch, said duplex electrodes and end plates being positioned in said modules so that their faces are parallel and the cathode surface of a given electrode faces the anode surface of an adjacent electrode, electrically insulating spacers placed between said electrodes, all of said anode end plates of said modules connected to a common electrical connector and all of said cathode end plates of said modules connected to a second electrical connector, the connectors for said anode end plates and cathode end plates being positioned in the module so that they are diametrically opposed, each of said duplex electrodes having openings in opposite edges through which pass the connectors, the so-parallel electrically connected modules being encased in an electrically insulating, liquid impervious protective coating said coating being shape conforming to said modules, said coating having one end wall fitted with an inlet port aligned to mate with one series of said openings in the connected modules, the other end wall of said protective coating having an exit port positioned to mate with the second series of openings in the conneted modules, the first and second series of openings in the opposite edges of said duplex electrodes in said connected modules providing a means for electrolyte flow from module to module from said inlet port to said exit port, and an aqueous electrolyte, said electrolyte flowing into said inlet port, between the plates of said modules and through said first and second series of openings in said duplex electrodes and exiting from the battery at said exit port.

References Cited by the Examiner
UNITED STATES PATENTS

| | | | |
|---|---|---|---|
| 1,771,190 | 7/30 | Polcich | 136—137 |
| 2,564,495 | 8/51 | Mullen | 136—90 |
| 2,640,090 | 5/53 | Pucher | 136—100 |
| 2,655,551 | 10/53 | Ellis | 136—100 |
| 2,684,395 | 7/54 | Chubb | 136—100 |
| 2,684,988 | 7/54 | Wilburn | 136—100 |
| 2,988,587 | 6/61 | Haring | 136—90 |

JOHN H. MACK, *Primary Examiner.*

JOHN R. SPECK, MURRAY TILLMAN, *Examiners.*